(12) United States Patent
Ippatapu et al.

(10) Patent No.: US 11,409,667 B1
(45) Date of Patent: Aug. 9, 2022

(54) METHOD AND APPARATUS FOR ACCELERATING DEDUPLICATION PROCESSING

(71) Applicant: EMC IP HOLDING COMPANY LLC, Hopkinton, MA (US)

(72) Inventors: Venkata Ippatapu, Westborough, MA (US); Ramesh Doddaiah, Westborough, MA (US)

(73) Assignee: Dell Products, L.P., Hopkinton, MA (US)

(*) Notice: Subject to any disclaimer, the term of this patent is extended or adjusted under 35 U.S.C. 154(b) by 0 days.

(21) Appl. No.: 17/231,073

(22) Filed: Apr. 15, 2021

(51) Int. Cl.
*G06F 12/123* (2016.01)
*G06F 12/0864* (2016.01)
*G06F 12/0817* (2016.01)
*G06F 3/06* (2006.01)
*G06F 12/0871* (2016.01)

(52) U.S. Cl.
CPC .......... *G06F 12/123* (2013.01); *G06F 3/0604* (2013.01); *G06F 3/0641* (2013.01); *G06F 3/0679* (2013.01); *G06F 12/0824* (2013.01); *G06F 12/0864* (2013.01); *G06F 12/0871* (2013.01)

(58) Field of Classification Search
CPC .... G06F 12/123; G06F 3/0604; G06F 3/0641; G06F 3/0679; G06F 12/0824; G06F 12/0871
See application file for complete search history.

(56) References Cited

U.S. PATENT DOCUMENTS

| 9,483,484 B1* | 11/2016 | Sridharan | G06F 16/1744 |
| 2013/0262404 A1* | 10/2013 | Daga | G06F 16/1748 |
| | | | 707/E17.002 |
| 2014/0115258 A1* | 4/2014 | Week | G06F 16/1752 |
| | | | 711/163 |
| 2017/0031994 A1* | 2/2017 | Patterson, III | G06F 3/0608 |

* cited by examiner

*Primary Examiner* — Charles Rones
*Assistant Examiner* — Hewy H Li
(74) *Attorney, Agent, or Firm* — Anderson Gorecki LLP

(57) ABSTRACT

A deduplication engine maintains a hash table containing hash values of tracks of data stored on managed drives of a storage system. The deduplication engine keeps track of how frequently the tracks are accessed by the deduplication engine using an exponential moving average for each track. Target tracks which are frequently accessed by the deduplication engine are cached in local memory, so that required byte-by-byte comparisons between the target track and write data may be performed locally rather than requiring the target track to be read from managed drives. The deduplication engine implements a Least Recently Used (LRU) cache data structure in local memory to manage locally cached tracks of data. If a track is to be removed from local memory, a final validation of the target track is implemented on the version stored in managed resources before evicting the track from the LRU cache.

14 Claims, 7 Drawing Sheets

Hash Table 160

| Track | Fingerprint (Hash) 730 | Counter 700 | EMA 710 | Cached Bit 720 |
|---|---|---|---|---|
| Track 220$_1$ | 0100100101010010 | 1 | 0 | 0 |
| Track 220$_2$ | 0010010010101001 | 23 | 12 | 1 |
| Track 220$_3$ | 1001001001010100 | 1 | 0 | 0 |
| Track 220$_4$ | 0100100100101010 | 1 | 0 | 0 |
| ⋮ | ⋮ | ⋮ | ⋮ | ⋮ |
| Track 220$_n$ | 1010010010010010 | 145 | 37 | 1 |

Receive Write $W_1$

Receive Write $W_2$; Hash $D_2 \neq$ Hash$D_1$

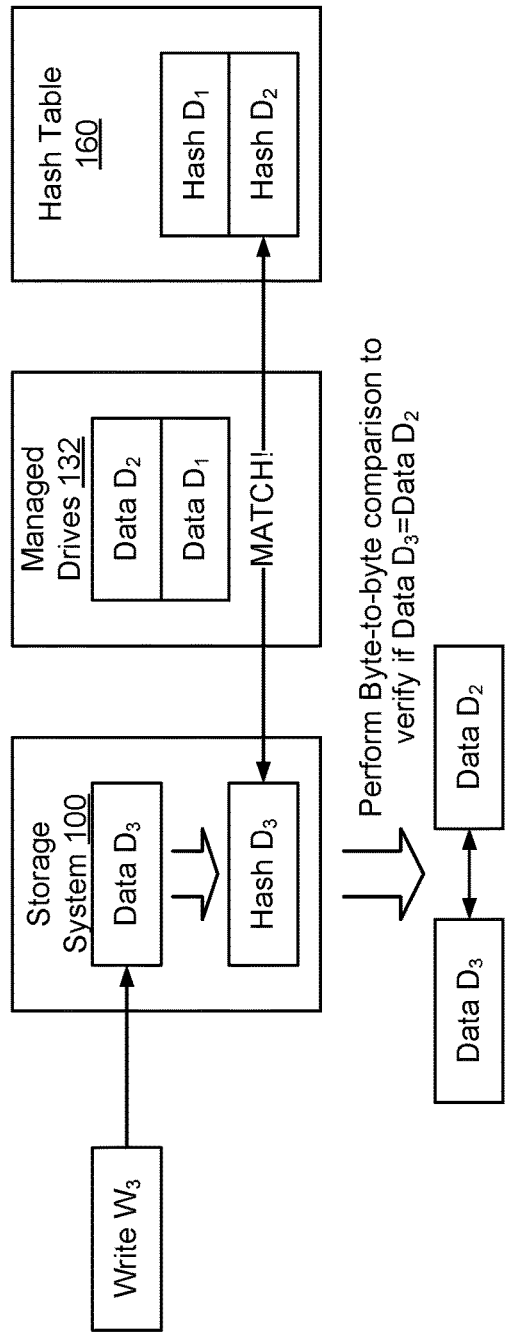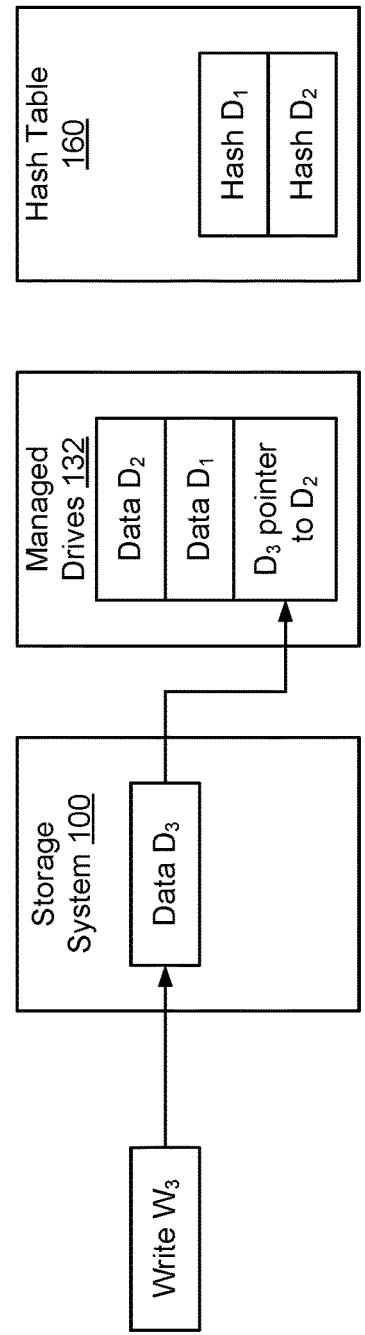

FIG. 7

Hash Table 160

| Track | Fingerprint (Hash) 730 | Counter 700 | EMA 710 | Cached Bit 720 |
|---|---|---|---|---|
| Track $220_1$ | 0100100101010010 | 1 | 0 | 0 |
| Track $220_2$ | 0010010010101001 | 23 | 12 | 1 |
| Track $220_3$ | 1001001001010100 | 1 | 0 | 0 |
| Track $220_4$ | 0100100100101010 | 1 | 0 | 0 |
| ••• | ••• | ••• | ••• | ••• |
| Track $220_n$ | 1010010010010010 | 145 | 37 | 1 |

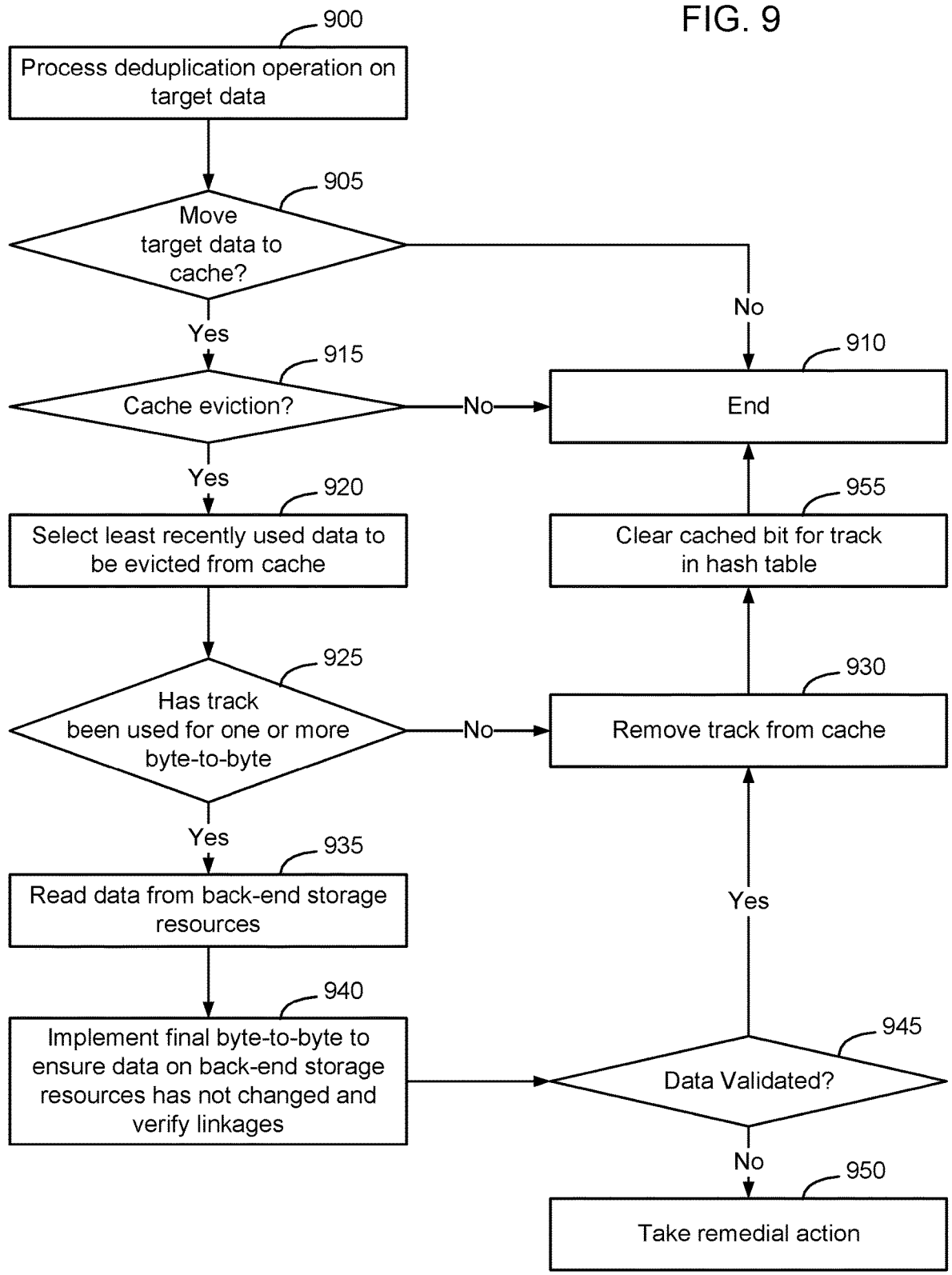

METHOD AND APPARATUS FOR ACCELERATING DEDUPLICATION PROCESSING

FIELD

This disclosure relates to computing systems and related devices and methods, and, more particularly, to a method and apparatus for accelerating deduplication processing.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A deduplication engine maintains a hash table containing hash values of tracks of data stored on managed drives of a storage system. The deduplication engine keeps track of how frequently the tracks are accessed by the deduplication engine using an exponential moving average for each track. Target tracks which are frequently accessed by the deduplication engine are cached in local memory, so that required byte-by-byte comparisons between the target track and write data may be performed locally rather than requiring the target track to be read from managed drives. The deduplication engine implements a Least Recently Used (LRU) cache data structure in local memory to manage locally cached tracks of data. If a track is to be removed from local memory, a final validation of the target track is implemented on the version stored in managed resources before evicting the track from the LRU cache.

BRIEF DESCRIPTION OF THE DRAWINGS

FIGS. 2-5 are functional block diagrams of an example method of implementing deduplication processing by a storage system, according to some embodiments.

FIG. 7 is a functional block diagram of an example hash table for use by the deduplication engine of FIG. 6, according to some embodiments.

FIG. 9 is a flow chart of an example method of evicting a track of data from a deduplication cache, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
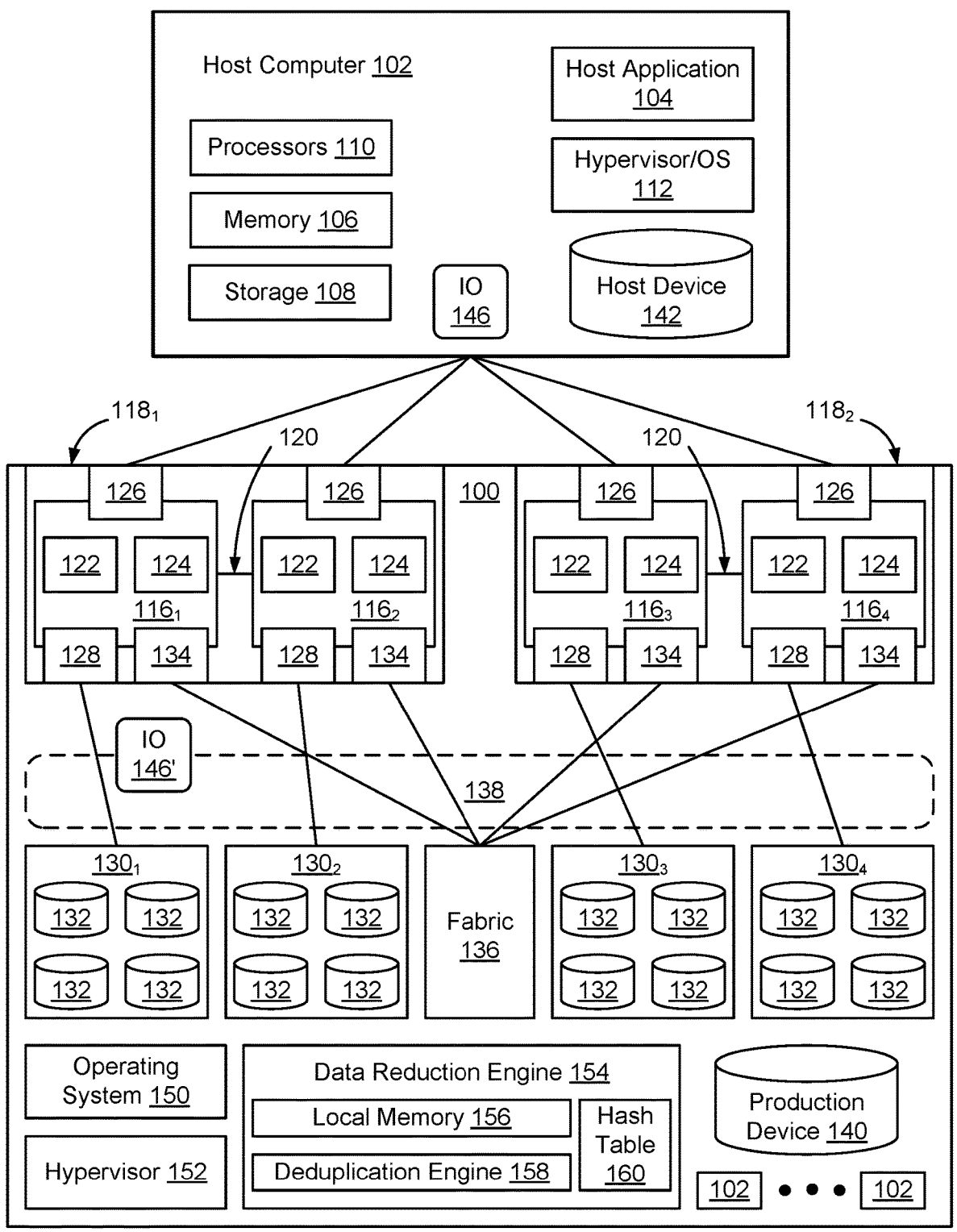
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the TDev to access the data of the production device 140.

When a write IO is received by the storage system 100, in some embodiments the storage system will process the data contained in the write IO to determine if the data is already stored on managed drives 132. In some embodiments, this is implemented by a data reduction engine 154. As shown in FIG. 1, in some embodiments the data reduction engine includes a local memory 156, deduplication engine 158, and hash table 160. The data reduction engine 154 may contain additional components, such as a compression engine (not shown) depending on the embodiment.

Figure 2:
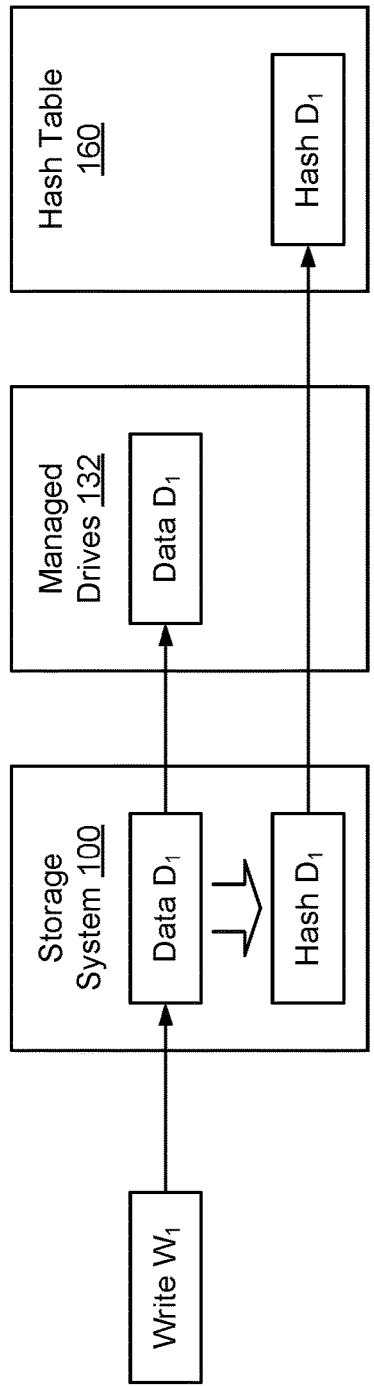

FIGS. 2-5 are functional block diagrams of an example method of implementing deduplication by a storage system, according to some embodiments. FIG. 2 shows an example in which the storage system receives a write $W_1$ containing data $D_1$. When the write $W_1$ is received, the deduplication engine 158 creates a fingerprint of the data $D_1$, for example using hash generator 270 (see FIG. 6) and compares the fingerprint with fingerprints of other tracks of data stored on managed drives 132. In FIG. 2 it is assumed that the data $D_1$ does not previously exist on managed drives 132 and, accordingly, data $D_1$ is stored on managed drives 132 and the fingerprint of data $D_1$ is stored in hash table 160.

In some embodiments the hash generator 270 generates fingerprints of data using a cryptographic hash algorithm, such as SHA-256 hash algorithm, configured to generate a 32-byte hash value for every 32 KB block of data. Another Secure Hash Algorithm (SHA) configured to output a different length digest, such as a 224, 384, or 512 bit digest may also be used depending on the implementation. Likewise, other cryptographic hash algorithms or other algorithms designed to deterministically generate fingerprints from of data received by the storage system 100 may also be used depending on the embodiment. For ease of explanation the data fingerprints are referred to herein as "hash" values.

Figure 3:
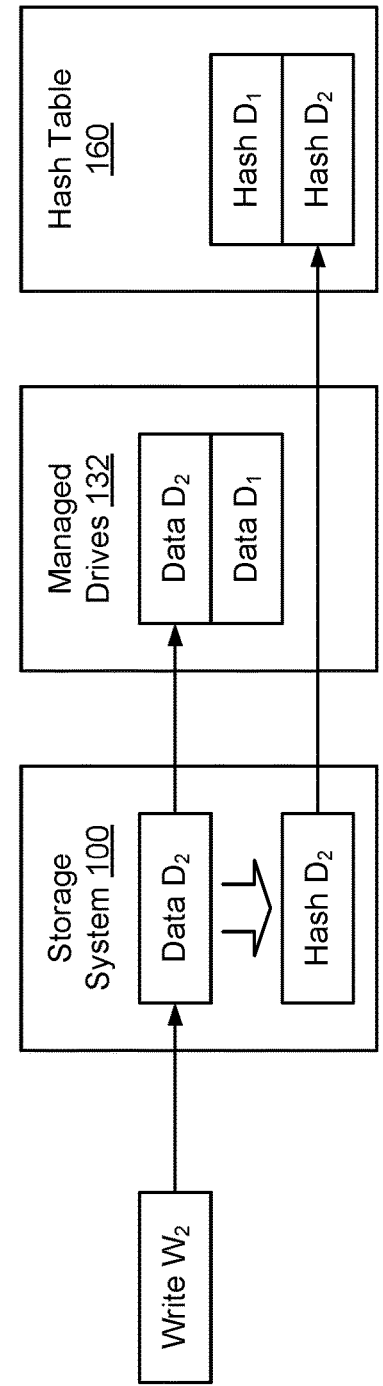

As shown in FIG. 3, every time data is received by the storage system, a hash of the received data is generated and compared against all other hash values in the hash table 160. In FIG. 3, when data $D_2$ is received, the deduplication engine 158 creates hash $D_2$ and compares hash $D_2$ against all the other hash values in hash table 160. Since hash $D_2$ does not equal hash $D_1$, the deduplication engine knows that the data $D_2$ is not currently stored on managed drives 132. Accordingly, the data $D_2$ is stored in managed drives 132 and hash $D_2$ is stored in the hash table 160.

FIG. 4 shows another scenario in which a write $W_3$ is received containing data $D_3$. As shown in FIG. 4, the deduplication engine creates a hash $D_3$ and compares hash $D_3$ with all other hash values in the hash table 160. In this instance, hash $D_3$ matches hash $D_2$, which indicates that it is possible that data $D_3$ matches data $D_2$. However, although it is unlikely, there is a possibility that two different pieces of data may generate the same hash value. Accordingly, to ensure that data $D_3$ is the same as data $D_2$, a byte-to-byte comparison is implemented to verify that data $D_3$ matches data $D_2$. This requires data $D_3$ to be read from managed drives 132 and, if compressed, to be decompressed so that the byte-to-byte comparison may be implemented.

As shown in FIG. 5, if the deduplication engine 158 determines, from the byte-to-byte comparison, that data $D_3$ matches data $D_2$, rather than storing identical copies of data in managed drives 132, the deduplication engine instead causes a pointer to data $D_2$ to be stored in metadata. Although the pointer is shown on managed drives 132 (for ease of illustration), in some embodiments the pointer resides in metadata tables that are stored in global memory 138.

There are instances when a storage system will be presented with the same data multiple times in rapid succession. For example, if an email is sent to a large number of employees, the email server may try to store multiple copies of the same email on the storage system 100. Rather than having the storage system 100 write multiple copies of the same email to its back-end storage resources 130, the data storage system may be configured to save one copy of the email and save pointers in metadata for each of the other copies. This is data efficient, in that it can dramatically reduce the amount of required back-end storage resources.

However, every time a hash match is determined, the deduplication engine 158 will need to read the existing data from the storage system's storage resources 130 and perform a byte-to-byte comparison between the existing data and the new data to ensure that the two actually match. To perform a byte-to-byte comparison, the currently stored copy of the data must be read from managed drives 132, and optionally decompressed if the data is stored in compressed form on the managed drives 132. The deduplication engine then performs the byte-to-byte (B2B) comparison of current host write data with the target data to avoid hash collisions and to validate the linkage of the data stored in managed drives 132.

Reading the data from disk and decompressing the data consumes significant disk access operations and, when the target data is compressed, can result in considerable use of decompression resources. For example, if the host writes the same 128K data pattern 25 times, then the storage system will end up reading the same disk data 25 times to perform the byte-to-byte operation and to validate the linkages. This wastes disk bandwidth unnecessarily, by reading the same data multiple times.

Figure 6:
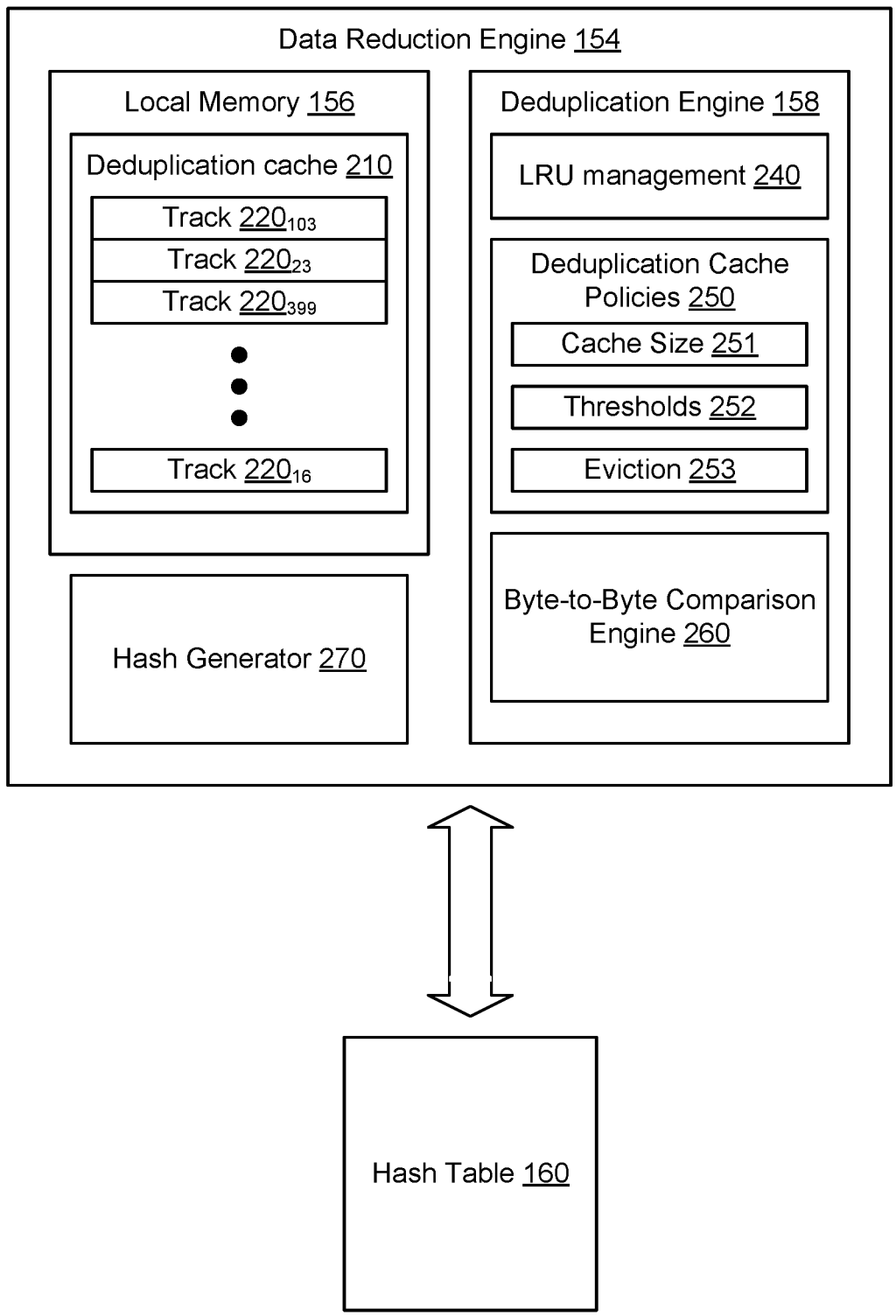
FIG. 6 is a functional block diagram of an example data reduction engine, showing addition details of an example deduplication engine, according to some embodiments.

FIG. 6 is a functional block diagram of an example deduplication engine, configured to accelerate deduplication processing, according to some embodiments. As shown in FIG. 6, in some embodiments the data reduction engine 154 has a local memory 156 and deduplication engine 158. Local memory, in some embodiments, is used to implement a deduplication cache 210 which may be implemented, for example, using a Least Recently Used (LRU) data structure. The deduplication cache 210 is used to store tracks of data that are frequently accessed by the deduplication engine 158 in connection with deduplication processes, to enable the byte-to-byte comparison operations to be implemented locally within the data reduction engine 154 rather than requiring the data to be read from back-end storage resources 130. This enables tracks that are accessed frequently by the deduplication engine 158 to be stored, to greatly reduce the amount of IO operations on the frequently accessed tracks.

As shown in FIG. 6, in some embodiments the deduplication engine includes deduplication cache management control logic 240 configured to manage entries in the deduplication cache 210. The deduplication cache management control logic 240 applies deduplication policies 250 which specify operational parameters of the deduplication cache 210. For example, one example deduplication cache policy 251 may be associated with the size of the deduplication cache, e.g. how much of local memory 156 should be used to implement the deduplication cache 210. In some embodiments, the size of the deduplication cache or the amount of local memory 156 used to implement the deduplication cache 210 is a variable parameter that can be adjusted on the storage system by the user, for example by setting the desired size in the deduplication size cache policy 251.

Another deduplication cache policy 252 may be used to specify which tracks should be added to the deduplication cache 210. For example, the policy 252 may specify one or more frequency thresholds such that, if a particular track is accessed more frequently than the threshold it is selected for placement in the deduplication cache 210. In some embodiments, frequency of track access is determined by looking at an exponential moving average of track access operations by the deduplication engine 158 on the track. In some embodiments, the deduplication cache policy 252 enables two thresholds to be specified—a first frequency threshold for storing a track of data in the deduplication cache in local memory, and a second frequency threshold for storing the track of data in global memory. In some embodiments, both of these thresholds are able to be set by a user, to enable the user to adjust how the deduplication engine utilizes the deduplication cache to optimize deduplication processing.

Another deduplication cache policy 253 may specify the manner in which tracks are processed when evicted from the cache. An example method that may be implemented in connection with a cache eviction event is discussed in greater detail below in connection with FIG. 9.

In some embodiments, the storage system 100 is configured to keep track of the number of deduplication hits per track in the hash table 160. According to some embodiments, as shown in FIG. 7, the deduplication engine 154 maintains, in the hash table 160, an Exponential Moving Average (EMA) 710 based on the number of times a given track has been accessed by the deduplication engine in the last S seconds, as specified by the frequency threshold deduplication cache policy 252. If the number of deduplication accesses to a particular track in the last S seconds crosses a first threshold T (e.g. as specified by cache policy 252), the deduplication engine caches the track in local memory 156 to enable future byte-to-byte comparisons to be implemented by byte-to-byte comparison engine 260 from local memory 156, rather than from back-end storage resources 130. Accordingly, if a new data write occurs which has a hash that matches the hash of a track stored in local memory 156, the deduplication engine can implement the byte-to-byte comparison from the copy contained in the deduplication cache 210 in local memory 156, without performing read operations on managed drives 132. In some embodiments, when a byte-to-byte comparison is implemented from local memory 156, the deduplication engine 158 still validates the linkage of the data stored in managed drives 132, thus adhering to the original dual goal of verifying the identicality of the two pieces of data and verifying the linkage of the data on back-end storage resources 130.

In some embodiments, if the exponential moving average of deduplication hits on a particular track cross a second threshold (e.g. specified in deduplication cache policy 252), the target disk data is stored in global memory 138, so that the target data can be used for byte-to-byte comparison operations by multiple data reduction engines 154.

In some embodiments, the storage system 100 saves the number of deduplication hits per track 700 in the hash table 160. In addition, an exponential moving average 710, calculated as the number of hits per track in the previous S number of seconds, is determined and stored in the hash table 160. If the exponential moving average number of hits on a given track in the preceding S second crosses a first threshold T, in some embodiments the target disc data is cached in the local memory 156 of the deduplication engine 158, and a "cached" bit 720 is set in the hash table 160. The "cached" bit 720 indicates, to the deduplication engine 158, that the track has been cached in local memory 156 so that the deduplication engine 158 can implement the byte-to-byte comparison using the cashed version of the data rather than reading the track from back-end storage resources 130 of storage system 100. This reduces the number of read operations associated with implementing deduplication processing, and also can result in a reduction in latency associated with verifying that the two pieces of data are duplicate copies. The deduplication engine 158 also verifies that linkages in connection with performing the byte-to-byte comparison. The variables S and T, in some embodiments, are user-adjustable values that may be set using the frequency threshold deduplication cache policy 252.

In some embodiments, if the exponential moving average of deduplication hits on a particular track exceeds a second threshold G, the track is copied to global memory so that the local copy of the track can be accessed by multiple deduplication engines 158 on the storage system 100. In some embodiments the second threshold G is two times the first threshold T, although the particular value may depend on the implementation. In some embodiments, the first and second thresholds (T and G) are parameters that are able to be adjusted on the storage system, to control the manner in which the deduplication engine selects tracks for inclusion in the deduplication cache and selects tracks for storage in global memory 138, for example by setting these values in the frequency threshold deduplication cache policy 252.

Because the deduplication engine has a finite amount of local memory, in some embodiments the deduplication engine stores frequently accessed tracks of data in a data structure such as a least recently used cache 210 in local memory 156. Every time a hit is received on a track that is added to the deduplication cache 210, the track is moved to the head of the cache, thus keeping more frequently used tracks in the cache for use in connection with subsequent deduplication byte-to-byte comparisons.

If the deduplication cache 210 is implemented as a LRU cache, and the deduplication cache 210 is full, adding a new track to the deduplication cache 210 will result in an eviction of the track at the end of the LRU cache. The particular manner in which evictions are processed by the deduplication engine 158 may be specified by the eviction policy 253. For example, in some embodiments, before removing a track from the least recently used cache, the utilization of the track is checked. If the cached track has been used for one or more byte-to-byte comparisons while stored in the cache, in some embodiments the corresponding data is read from back-end storage resources 132 and a final byte-to-byte comparison is implemented on the track that is to be ejected from the cache, to ensure that the data stored on back-end storage resources has not changed with respect to the local (cached) copy of the data and to validate all required linkages to the copy stored in back-end storage resources 130. Once the data on disk has been validated and the linkages are validated, the track is removed from the cache and the "cached" bit is cleared in the hash table.

Although some embodiments have been described in connection with implementation of write IOs from host applications 104 in connection with inline deduplication, local caching of tracks of data can also be used in connection with background processes, for example if deduplication is implemented in connection with repacking data previously stored on back-end storage resources.

In some embodiments, a storage system 100 may encounter delays associated with fast path IO host writes, for example in connection with accessing processing resources or compression hardware, due to contention for these resources from background applications. Example background applications may include a background deduplication task, Remote Data Forwarding (RDF) compression, etc. Some of these background applications are resource intensive applications, which are constantly executing disk access operations and using compression hardware resources, which can decrease the ability of the storage system 100 to implement other operations and induce latency in processing IO operations on the storage system 100. By enabling the deduplication engine to store some of the most frequently accessed tracks in local memory, the queuing delay associated with deduplication processing can be greatly reduced, which indirectly helps to improve performance of the other background applications that are executing on the storage system 100.

Storing copies of frequently used tracks in the deduplication cache makes those tracks immediately available to the deduplication engine 158, if a byte-ty-byte comparison needs to be implemented on one of the tracks. Because the backend disk data and location are readily available for implementation of the byte-to-byte comparison, deduplication processing on cached tracks of data are able to be processed significantly faster than a normal deduplication process, in which the data would need to be read from back-end storage resources 130. This presents a system wide effective design solution, by significantly eliminating the runtime workload, optimizing the fabric, memory, or disk reads, reducing the use of compression hardware bandwidth, and reducing deduplication processing latency, thus allowing system applications to more effectively execute on available storage system resources.

FIG. 7 is a functional block diagram of an example data structure configured to implement a hash table 160, according to some embodiments. As shown in FIG. 7, in some embodiments the hash table 160 includes a track ID (labeled $220_1$-$220_n$), a fingerprint 730 which in some embodiments is a 32-byte hash value created from the data stored at the track ID, and a counter 700 that indicates the total number of times the data at the track ID has been accessed by the deduplication engine 158. Additionally, as shown in FIG. 7, in some embodiments the hash table 160 also includes an Exponential Moving Average (EMA) value 710 indicating the number of times the data associated with the track ID has been accessed by the deduplication engine 158 in the previous S seconds. Although the hash table shown in FIG. 7 is illustrated as a data structure in the form of a table, other data structures may be used as well. Likewise, although the data contained in the data structure of FIG. 7 is shown sorted according to track ID, other ways of organizing the data contained in the data structure may be used, for example a weight balanced binary search tree, to optimize searching for particular hash values.

In some embodiments the exponential moving average 710 is used by the data reduction engine to select the most frequently accessed tracks to be placed into the deduplication cache 210 in local memory 156. For example, in FIG. 7 if the threshold EMA is 10, track $220_2$ and track $220_n$ have an EMA that exceeds 10, and accordingly, the data stored at track $220_2$ and track $220_n$ will be stored in the deduplication cache 210 in local memory 156.

As shown in FIG. 7, in addition to maintaining the EMA for each track, if a track is moved into local memory 156, a cached bit 720 is set for the track to identify the track as residing both in local memory 156 and on managed drives 132. The cache bit 720 indicates, to deduplication engine 158, that the data associated with the track resides in local memory. Accordingly, when the cached bit 720 is set, the byte-to-byte comparison engine 260 can implement the byte-to-byte comparison locally, without reading the track from managed drives 132. If a subsequent write is received on the track which causes the data stored at the track to change, the cached bit 720 is used to specify that the data needs to be removed from local memory 156 in connection with cleaning up the data. Accordingly, if for some reason the target disk data changes due to new write, then as part of deleting the target fingerprint in the hash table 160 for old disk data, the cached bit 720 is also reset and any locally stored copies of the data will be removed from local memory 156.

Figure 8:
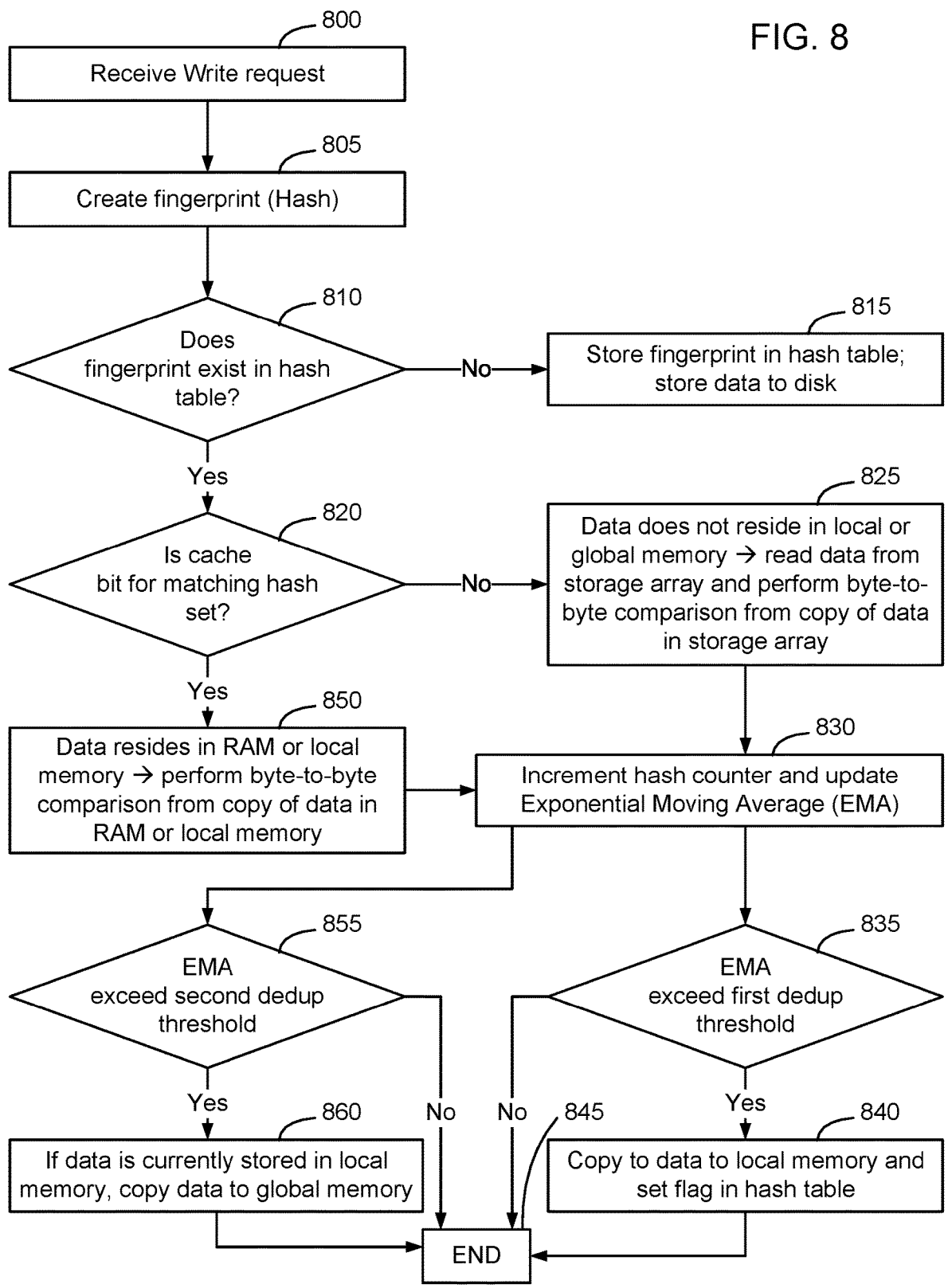
FIG. 8 is a flow chart of an example method of accelerating deduplication processing, according to some embodiments.

FIG. 8 is a flow chart of an example method of accelerating deduplication processing, according to some embodiments. As shown in FIG. 8, when a write request is received (block 800) the data contained in the write request is passed to the data reduction engine 154 and the hash generator 270 of the deduplication engine 158 creates a fingerprint (hash) 730 of the data (block 805). Optionally the write data may also be passed to a compression engine, depending on the embodiment.

Once the fingerprint 730 has been created, the deduplication engine 158 performs a search on the hash table 160 to determine if the hash matches any existing fingerprint in the hash table 160 (block 815). If the deduplication engine 158 determines that the fingerprint of the write data doesn't match any existing fingerprint in the hash table (a determination of NO at block 810), the write data is unique on the storage system 100 and the write data is stored in managed drives 132.

If the deduplication engine 158 determines that the hash of the write data does match an existing fingerprint in the hash table (a determination of YES at block 810), it is possible (highly likely) that the write data already exists on the storage system, and might not need to be stored in managed drives 132. To verify that the write data matches the previously stored data (target data), the deduplication engine 158 will need to implement a byte-to-byte comparison, for example using byte-to-byte comparison engine 260, to compare the write data and the target data.

According to some embodiments, the deduplication engine 158 checks the hash table 160 to determine if the cached bit 720 has been set for the target data (block 820). If the cached bit 720 has been set for the target data in the hash table 160 (a determination of YES at block 820), the data resides in the deduplication cache 210 in local storage 156 or in global memory. Accordingly, the byte-to-byte comparison may be implemented using the copy that is stored in local or global memory (block 850).

If the cached bit 720 has not been set for the target data in the hash table 160 (a determination of NO at block 820), the data does not reside in the deduplication cache 210 in local storage 156, or in global memory 138, and accordingly the byte-to-byte comparison must be implemented by reading the target data from managed drives 132. The deduplication engine 138 accordingly reads the target data from managed drives 132 and performs a byte-to-byte comparison between the write data and the target data (block 825).

In connection with implementing the byte-to-byte comparison, locally from deduplication cache 210 or from managed drives 132, the deduplication engine 158 increments the counter 700 for the target data and updates the Exponential Moving Average (EMA) 710 for the target data (block 830). A determination is made, based on the updated EMA 710, as to whether the EMA 710 for the target data exceeds a first threshold (block 835). If the EMA 710 for the target data does not exceed the first threshold (a determination of NO at block 835) the target data is not red-hot data, from a deduplication standpoint, and the process ends (block 845). If the EMA 710 for the target data exceeds the first threshold (a determination of YES at block 835), the target data is determined to be red-hot data, from a deduplication standpoint. The target data is then copied to the deduplication cache 210 in local memory 156 and the cached bit 720 for the track is set in the hash table 160 (block 840).

In some embodiments, a determination is also made, based on the updated EMA 720, as to whether the EMA 720 for the target data exceeds a second threshold (block 855). Target data with a sufficiently high EMA 720 may indicate that the data is also likely to be encountered by other data reduction engines 154 on the storage system 100. Accordingly, as shown in FIG. 8, in some embodiments if the EMA 720 of the target data exceeds a second deduplication threshold (a determination of YES at block 855), the target data will be copied to a slot of global memory 138 (block 860). If the EMA 720 of the target data does not exceed the second deduplication threshold (a determination of NO at block 855) the process ends (block 845).

By identifying target tracks that have been recently frequently accessed by the deduplication engine 158, and selectively storing those target tracks either in local memory 156 or global memory 138, it is possible to accelerate deduplication processing relative to those highly accessed target tracks. Specifically, since the deduplication engine 158 has a copy of the target track in local memory 156 or has access to the target track in global memory 138, the deduplication engine 158 can implement byte-to-byte comparisons against the target track directly without waiting for the target track to be read from managed drives 132. This can significantly reduce latency associated with implementing deduplication processing, and also minimizes the amount of processing that must occur on the storage system by eliminating the need to read the target data from managed drives 132. In instances where the target data is stored in compressed form on managed drives 132, storing the target data in local memory 156 or in global memory 138, also reduces the load on the compression engine, because the target data is able to be stored in uncompressed form in local memory 156 or global memory 138, thus obviating the need to decompress the target data prior to implementing the byte-to-byte comparison between the write data and target data.

If the deduplication cache 210 is implemented as a LRU cache, and the deduplication cache 210 is full, adding a new track to the deduplication cache 210 will result in an eviction of the track at the end of the LRU cache. The particular manner in which evictions are processed by the deduplication engine 158 may be specified by the eviction policy 253. For example, in some embodiments, before removing a track from the least recently used cache, the utilization of the track is checked. If the cached track has been used for one or more byte-to-byte comparisons while stored in the cache, in some embodiments the corresponding data is read from back-end storage resources 132 and a final byte-to-byte comparison is implemented on the track that is to be ejected from the cache, to ensure that the data stored on back-end storage resources has not changed with respect to the local (cached) copy of the data and to validate all required linkages to ensure the copy of data on back-end storage resources is not broken. Once the data on disk has been validated and the linkages are validated, the track is removed from the cache and the "cached" bit 720 is cleared in the hash table 160.

FIG. 9 is a flow chart of an example method of evicting a track of data from a deduplication cache, according to some embodiments. As shown in FIG. 9, when the deduplication engine 158 processes a deduplication operation on a target piece of data (block 900), the deduplication engine 158 will determine whether to move the target data to the deduplication cache 210 (block 905). If the deduplication engine 158 determines to not move the target data to the deduplication cache 210 (a determination of NO at block 905) the process ends (block 910).

If the deduplication engine 158 determines that the target data should be moved to the deduplication cache 210 (a determination of YES at block 905), a determination is made as to whether moving the target data to the deduplication cache 210 will result in an eviction of another track of data from the deduplication cache 210 (block 915). Tracks of data will be removed from the deduplication cache 210 for various reasons, for example if there is a write to the source data on managed drives 132, so not every addition to the deduplication cache 210 will necessarily result in an eviction. If adding the target track to the deduplication cache 210 does not result in an eviction (a determination of NO at block 915), the process ends (block 910).

If adding the target track to the deduplication cache 210 will result in an eviction of another track of data from the deduplication cache 210 (a determination of YES at block 915), in an implementation where the deduplication cache is structured as a Least Recently Used (LRU) cache, the least recently used track of data will be selected to be evicted from the cache (block 920).

A determination is then implemented, at block 925, as to whether the track has been used for one or more byte-to-byte comparisons while the track was contained in the deduplication cache 210. If the track has not been accessed since it was added to the deduplication cache (a determination of NO at block 925) the track can simply be removed from the cache (block 930), the cached bit 720 for the track is reset in the hash table 160 (block 955), and the process ends (block 910).

If the track has been used for one or more byte-to-byte comparisons while the track was contained in the deduplication cache 210 (a determination of YES at block 925), in some embodiments the target data is read from back-end storage resources 132 (block 935) and a byte-to-byte comparison is implemented between the copy of the data stored in deduplication cache 210 and the copy of the data stored on back-end storage resources (block 940), to validate the data stored on back-end storage resources and verify the linkage. If the data stored in back-end storage resources 132 is validated (a determination of YES at block 945) the track is removed from the cache (block 930), the cached bit 720 for the track is reset in the hash table 160 (block 955), and the process ends (block 910). If the byte-to-byte comparison determines that there is a difference between the two copies of the track, or if the linkage of the copy of data stored in back-end storage resources is not validated (a determination of NO at block 945) the storage system can take appropriate remedial action (block 950). The manner in which this is handled will depend on the particular configuration of the storage system 100 and how these types of situations are configured to be managed.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for accelerating deduplication processing, the computer program including a set of instructions which, when executed by a computer, cause the computer to perform a method comprising the steps of:
    maintaining a hash table containing a plurality of entries, each entry identifying a track of data stored on managed drives, a hash value computed from data stored at the identified track, an exponential moving average indicating a number of times a deduplication engine has accessed the data stored at the identified track in a recent time interval, and a flag indicating whether the data stored at the identified track has been cached in local memory or in global memory;
    receiving a write operation containing write data;
    calculating a hash value of the write data;
    using the hash value of the write data to determine whether any entry of the hash table has the same hash value;
    if the hash value of the write data matches a respective one of the entries of the hash table, reading a respective flag for the entry to determine if data stored at a respective track of managed storage resources (target data) has been stored in local memory or in global memory;
    if the respective flag indicates that the target data has been stored in local memory or in global memory, performing a byte-to-byte comparison between the write data and the target data based on the copy of the target data in local memory or in global memory; and
    if the respective flag indicates that the target data has not been cached in local memory or in global memory, performing the byte-to-byte comparison between the write data and the target data by reading the target data from the respective track of managed storage resources.

2. The non-transitory tangible computer readable storage medium of claim 1, the method further comprising incrementing a deduplication counter for the target data in the hash table.

3. The non-transitory tangible computer readable storage medium of claim 1, the method further comprising calculating an exponential moving average number of hits on the target data in a preceding time interval.

4. The non-transitory tangible computer readable storage medium of claim 3, the method further comprising if the flag indicates that the target data has not been cached in local memory, and the exponential moving average number of hits on the target data exceeds a first threshold, copying the target data to local memory.

5. The non-transitory tangible computer readable storage medium of claim 3, the method further comprising if the flag indicates that the target data has been cached in local memory, and the exponential moving average number of hits on the target data exceeds a second threshold, copying the target data to global memory.

6. The non-transitory tangible computer readable storage medium of claim 1, the method further comprising implementing a least recently used cache data structure in local memory.

7. The non-transitory tangible computer readable storage medium of claim 6, the method further comprising copying the target data to local memory and evicting a least recently used track of data from the least recently used cache data structure.

8. The non-transitory tangible computer readable storage medium of claim 7, wherein evicting the least recently used track of data from the least recently used cache data structure comprises reading a corresponding track of data from managed storage resources, performing a byte-to-byte comparison between the least recently used track of data and corresponding track of data from managed resources, and verifying a linkage of the corresponding track of data in managed resources.

9. The non-transitory tangible computer readable storage medium of claim 8, the method further comprising removing the least recently used track of data from the cache and resetting a corresponding flag for the least recently used track of data in the hash table.

10. The non-transitory tangible computer readable storage medium of claim 1, the method further comprising:
    if the write operation comprises changing the content of a first track of data that is currently stored in managed storage resources, performing the steps of:
    removing a respective first hash table entry for the first track of data from the hash table;
    reading a respective first flag of the first hash table entry to determine if the first track of data has been stored in local memory or in global memory; and
    if the respective first flag of the first hash table entry indicates that the first track of data has been stored in local memory or in global memory, removing the first track of data from local memory or global memory.

11. The non-transitory tangible computer readable storage medium of claim 1, the method further comprising maintaining a set of deduplication cache policies associated with criteria for storing tracks of data in local memory or global memory.

12. The non-transitory tangible computer readable storage medium of claim 11, wherein a first of the deduplication cache policies specifies an amount of local memory to be used for storing tracks of data for deduplication processing.

13. The non-transitory tangible computer readable storage medium of claim 12, wherein a second of the deduplication cache policies specifies an exponential moving average threshold for selecting tracks of data to be stored in the local memory or global memory.

14. The non-transitory tangible computer readable storage medium of claim 13, wherein a third of the deduplication cache policies specifies a processes to be followed in connection with removing tracks of data from local memory or global memory.

* * * * *